United States Patent [19]

Wada et al.

[11] Patent Number: 4,814,915
[45] Date of Patent: Mar. 21, 1989

[54] MAGNETIC HEAD SLIDER AND MATERIAL THEREFOR

[75] Inventors: Toshiaki Wada, Takatsuki; Mitsuhiko Furukawa; Masaharu Shiroyama, both of Fukuoka; Michito Miyahara, Nakagawa; Shigeki Mohri, Tosu; Mitsuyoshi Nagano, Saga, all of Japan

[73] Assignees: Sumitomo Special Metals Co., Ltd., Osaka; Nippon Tungsten Co., Ltd., Fukuoka, both of Japan

[21] Appl. No.: 58,529

[22] Filed: May 26, 1987

[30] Foreign Application Priority Data

May 26, 1986 [JP] Japan ................................. 61-120855

[51] Int. Cl.$^4$ ............................................. G11B 15/64
[52] U.S. Cl. ..................................... 360/103; 501/105
[58] Field of Search ............... 360/102, 103, 122, 129, 360/110, 125; 501/104, 105

[56] References Cited

U.S. PATENT DOCUMENTS

| | | | |
|---|---|---|---|
| 4,251,841 | 2/1981 | Jacobs ................................. | 360/122 |
| 4,430,440 | 2/1984 | Wada et al. ...................... | 360/103 X |
| 4,582,812 | 4/1986 | Furukawa et al. ............. | 360/103 X |
| 4,598,052 | 7/1986 | Wada et al. ........................... | 501/87 |
| 4,660,114 | 4/1987 | Yamakawa et al. ............ | 360/103 X |

FOREIGN PATENT DOCUMENTS

| | | | |
|---|---|---|---|
| 0137134 | 4/1985 | European Pat. Off. ............ | 360/103 |
| 3535023 | 4/1986 | Fed. Rep. of Germany ...... | 360/122 |
| 55-163665 | 12/1980 | Japan . | |
| 60-171617 | 9/1985 | Japan . | |

*Primary Examiner*—Robert S. Tupper
*Assistant Examiner*—Andrew L. Sniezek
*Attorney, Agent, or Firm*—Burns, Doane, Swecker & Mathis

[57] ABSTRACT

A magnetic head slider and a material for it which comprises a sintered body obtained by sintering a raw material powder composed of 65 to 90% by weight of $ZrO_2$ component containing therein a stabilizer and the balance of $Al_2O_3$ component, 2% by weight or below of which has been substituted with a binder. The stabilizer is $Y_2O_3$, MgO or CeO and the binder is $Y_2O_3$ or MgO.

19 Claims, 1 Drawing Sheet

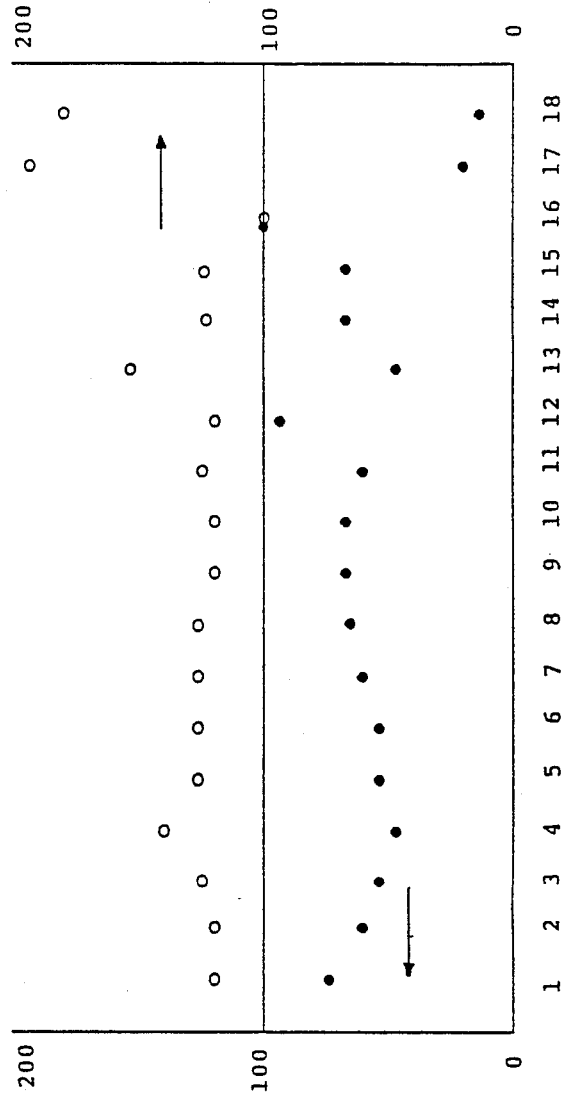

MAGNETIC HEAD SLIDER AND MATERIAL THEREFOR

BACKGROUND OF THE INVENTION

This invention relates to a magnetic head slider and a material therefor. More particularly, it is concerned with such magnetic head slider for recording and reproducing information to be used in computers, audio-visual appliances, video tape recorders, and so forth, as well as materials for such magnetic head slider and materials for wear-resistant functional component members for magnetic tapes.

For such magnetic head slider for recording and reproducing information, there have so far been used polycrystalline Ni-Zn ferrite, Mn-Zn ferrite, single crystal Mn-Zn ferrite, high hardness permalloy, and so on.

Nowadays, improvement in the recording density and wear-resistant property in the magnetic recording has been so ardently desired, and, for satisfying such desire, technique of forming a thin film magnetic head has been much more attempted. With the progress in such thin film magnetic head, selection of the optimum materials has been made to satisfy the characteristics required of each of the materials for the magnetic circuit members for the recording and reproduction, and material for the wear-resistant magnetic head slider.

In more detail, it has been contemplated to be desirable to use, as the material for the magnetic circuit, thin films of permalloy, sendust or amorphous materials which have excellent magnetic characteristic in the high frequency band, while, as the material for the functional component members which are required to have the wear-resistant property, alumina type materials.

The materials for such wear-resistant sliding member are primarily non-magnetic, but they are required to have various properties such as the wear-resistant property, precision-machinability (or grindability), machining efficiency, high mechanical strength, high density of the material structure, compatibility with the recording medium, lubricating property, thermal matching with metal thin film, and others.

"$Al_2O_3$-TiC" composite material as disclosed in Japanese Patent Kokai Publication No. 55-163665 as the material for the magnetic head slider is excellent in its various properties and has therefore been regarded up to the present as one of the most suitable material for such wear-resistant functional members. This material, however, can in no way be said to be a stable material in respect of its compatibility with the recording medium, lubricating property, and precision machinability (in particular, machining yield).

Japanese Patent Kokai Publication No. 57-198578 proposes $TiO_2$-$Al_2O_3$ type materials for the magnetic head slider, in which the compatibility with the recording medium and the lubricating property thereof have been improved in contrast to those of the $Al_2O_3$-TiC material. The materials have excellent characteristics in many aspects, and, therefore, they are considered to be one of the most suitable materials for the wear-resistant functional component members in the magnetic head slider. However, the materials still have their own points of problem such that they are inferior in their machinability, mechanical properties (in particular, poor machining yield).

Furthermire, Japanese Patent Kokai Publication No. 60-171617 proposes, as the material having its improved property in chipping during the slicing step, a ceramic substrate for the thin film magnetic head which consists principally of zirconia. However, with the material composed of a partially stabilized $ZrO_2$ as the principal component, there still remain such problems that it readily undergoes thermal deterioration, and that the monoclinic crystals increase due to heating to a temperature level of several hundreds degrees Centigrade and subsequent cooling at the time of forming such thin film onto the substrate, with the consequent problems of the substrate such as deterioration in its mechanical strength and warping due to volume change.

When such tough ceramic is used as the materials for the magnetic head slider, its machining into a complicated configuration becomes difficult owing to its poor machinability.

SUMMARY OF THE DISCLOSURE

It is an object of the present invention to provide a magnetic head slider and materials for use in such slider, which is capable of satisfying various properties required of the wear-resistant functional members of the magnetic head slider, such as wear-resistant property, precision machinability, machining efficiency, high mechanical strength, density of the material constitution, compatibility with the recording medium, lubricating property, and so forth; in particular, those materials having excellent characteristics in the precision machinability, the mechanical strength, and the lubricating property.

Other objects will become apparent in the entire disclosure.

In view of various points of problem as mentioned above, the present inventors have made strenuous efforts in their study and researches to obtain improvement in such magnetic head slider and the materials therefor having particularly excellent precision machinability, mechanical strength, and the lubricating property, as the result of which they have found that $ZrO_2$-$Al_2O_3$ type materials could satisfy these properties and possess favorable characteristics as the material for the magnetic head slider, based on which finding they have completed the present invention.

More specifically, the inventive material for the magnetic head slider (in particular, a substrate member therefor) composed of a sintered body obtained by sintering material powder composed of 65 to 90% by weight of a $ZrO_2$ component and the balance being $Al_2O_3$ component, 2% by weight or below of $Al_2O_3$ having been substituted with a binder consisting at least one kind of $Y_2O_3$ and MgO. The material composed of such sintered body has the $ZrO_2$ component having substantially tetragonal crystal structure capable of providing high mechanical strength, high toughness and high sliding property, the $ZrO_2$ component being a major phase (continuous matrix).

The magnetic head slider is further completed by preparing the substrate member from this material. By the way, the term "the substrate member for the magnetic slider" designates a planar member with predetermined number of required grooves having been formed on one major surface thereof, and with a side end surface thereof having been made a surface, on which a thin film magnetic circuit is to be formed on it; usually, after formation of the thin film magnetic circuit, this half-finished magnetic head slider is further cut into a number of individual slider main bodies.

In order to make ZrO$_2$ component to have a substantially tetragonal structure, it is necessary that at least one kind of a stabilizer selected from Y$_2$O$_3$, MgO and CeO be included in the ZrO$_2$ component. Such stabilizer is required to be included in the ZrO$_2$ component at a ratio of 1.8 to 10.5% by weight in the case of Y$_2$O$_3$, 2.0 to 4.3% by weight in the case of MgO, and 8.2 to 13.4% by weight in the case of CeO. The term "substantially tetragonal structure" encompasses those ZrO$_2$ which has about 80 vol % or more tetragonal structure fraction in the entire zirconia. This corresponds to an X-ray diffraction index ratio of 0.4 or below in terms of M(11$\bar{1}$)+C(200)/T(200), where M(11$\bar{1}$), C(200) and T(200) represent the X-ray diffraction indexes for monoclinic, cubic and tetragonal structure, respectively. In other words, a minor amount of monoclinic and/or cubic structure may be present.

When the tetragonal ZrO$_2$ is present in the material for the magnetic head slider according to the present invention, there takes transformation from the tetragonal structure to the monoclinic structure when external force is exerted thereto with the consequence that the mechanical property of the material, particularly its mechanical strength and toughness, would improve due to the so-called stress-inducing transformation mechanism.

While the tetragonal ZrO$_2$ tends to generally bring about the grain growth, there would emerge remarkable effect in the size reduction in the crystal grains due to a complex phase structure by ZrO$_2$ combined with Al$_2$O$_3$. As the consequence of this, the average crystal size is reduced to 1.5 μm or below, which contributes not only to improvement in reduction of chipping, density and wear-resistance of the material, but also to remarkable improvement in the abovementioned thermal deterioration.

Thus, the material for the magnetic head slider according to the present invention satisfies various characteristics required of the wear-resistant functional members for the magnetic head slider such as wear-resistant property, precision machinability, machining efficiency, high mechanical strength, densified structure of the material, compatibility with the recording medium, lubricating property, and so forth; in particular, having excellent characteristics in the precision machinability, the mechanical strength, and the lubricating property. Accordingly, the material is capable of exhibiting its significant effect such that it can be subjected to very precise processing with the least chipping, from which a favorable thin film magnetic head slider can be obtained.

In the case where the binder(s) for the Al$_2$O$_3$ component is (are) the same as the stabilizer(s) for the ZrO$_2$ component, strong bonding force is produced between both components, resulting in high toughness. This preferred embodiment can provide a superfine precision machining without pulling out of the crystal grains.

The foregoing objects, other objects as well as specific ingredients for the material constituting the magnetic head slider according to the present invention will become more apparent and understandable from the following detailed description thereof, when read in conjunction with the accomanying drawing.

BRIEF DESCRIPTION OF THE ACCOMPANYING DRAWING

In the drawing, the single FIGURE is a graphical representation showing the results of friction and wear tests by a pin-disc method.

DETAILED DESCRIPTION OF PREFERRED EMBODIMENTS

In the present invention, the ZrO$_2$ component containing therein a stabilizer constitutes, together with the Al$_2$O$_3$ component containing therein Y$_2$O$_3$ and MgO, the principal ingredient in the material powder of this system. With the ZrO$_2$ component being below 65% by weight, the mechanical strength and toughness of the material are instable, and no improvement is seen in the chipping of the material during the slicing step and the lubricating property as compared with the Al$_2$O$_3$-TiC type materials which have so far been frequently used. With the ZrO$_2$ component exceeding 90% by weight, there takes place increase in the monoclinic crystals of ZrO$_2$ due to heating of the material to several hundred degrees and subsequent cooling of the same at the time of forming the thin film onto the substrate with the consequent problems such that the mechanical strength of the material deteriorates and the substrate becomes warped by such heat-treatment. In view of this, the content of the ZrO$_2$ component containing the stabilizer should be in a range of from 65 to 90% by weight, and preferably 70 to 85% by weight. Note the balance is essentially the Al$_2$O$_3$ component.

Further, in the present invention, 2% by weight or below (but excluding zero) of the Al$_2$O$_3$ component to be contained in the starting material powder is substituted with at least one sintering aid of Y$_2$O$_3$ and MgO. The reason for this is as follows. That is to say, by substituting Y$_2$O$_3$ and MgO for a part of the Al$_2$O$_3$ component, there will be exhibited the sinter-promoting effect with the result that the sintering temperature becomes gradually low in comparison with these components which do not contain Y$_2$O$_3$ and MgO at all, whereby the sintered body having uniform and fine structure can be obtained. In contrast to this, when the substituting quantity exceeds 2% by weight, there takes place increase in pores in the sintered body, which is liable to reduce hardness of the material. The sintering aid for Al$_2$O$_3$ is preferably no more than 1.5% by weight.

It should be noted that the sintering aid contained in the Al$_2$O$_3$ component is of the same kind as some of those contained as the stabilizer in the ZrO$_2$ component. This combination is also believed to contribute to the advantage of the invention.

As for the stabilizer of ZrO$_2$, the amounts thereof in % by weight correspond to the molar fraction as follows:

| | | | |
|---|---|---|---|
| Y$_2$O$_3$ | 1.8–10.5 wt %, (1.0–6.0 mol %) | preferably | 3.6–7.1 wt % (2–4 mol %) |
| MgO | 2.0–4.3 wt %, (6–12 mol %) | preferably | 2.0–2.8 wt % (6–8 mol %) |
| CeO | 8.2–13.4 wt %, (6–10 mol %) | preferably | 8.2–10.8 wt % (6–8 mol %) |

In the case where two or more kinds of the stabilizer are employed, the total amount is preferably within 2.5–15 wt %.

(Method for Production)

The abovementioned material for the magnetic head slider according to the present invention may be produced in the following manner. A partially stabilized $ZrO_2$ component powder containing therein a predetermined amount of the stabilizer such as $Y_2O_3$, MgO, CeO and so on, which have been obtained by a coprecipitation method or the thermal decomposition method, is blended with a high purity $Al_2O_3$ component powder, 2% by weight or below of which has been substituted with at least one kind of $Y_2O_3$ and MgO, in their predetermined quantities, and then the blend is subjected to wet type mixing and pulverization (wet milling), followed by drying and granulating the same to prepare the starting material powder. Alternatively, as the starting materials for the $ZrO_2$ component, the $Al_2O_3$ component, and a binder, there may also be used a powder material obtained by blending salts (e.g. chlorides etc.) of componental elements Zr, Y, Al, Mg, Ca, etc. in such a manner that they may constitute the composition according to the present invention, in terms of their oxides, and then subjecting the mixture to coprecipitation or thermal decomposition.

The raw material powder may be sintered by a pressure-sintering method which include hot-pressing method, hot isostatic press sintering metod or the like. The thus obtained raw material powder is charged in a mold (e.g., of graphite or the like refractory mold) a subjected to the sintering process at an optimum sintering temperature ranging from 1,300° C. to 1,600° C. and under a pressure in a range of from 100 kg/cm² to 300 kg/cm² for a predetermined period of time, thereby obtaining a $ZrO_2$-$Al_2O_3$ type ceramic sintered body having a relative density of 99% or higher (hot-pressing method).

The $ZrO_2$-$Al_2O_3$ type ceramics sintered body according to the present invention can also be produced by the hot isostatic press sintering (HIP) method. In more detail, the abovementioned material powder is subjected to shaping by various shaping methods such as metal mold press method, cold isostatic press (CIP) method, doctor blade method, slip-casting method, and so on; then, the thus obtained shaped body (or compact) is pre-sintered in an oxidizing or non-oxidizing atmosphere at a temperature ranging from 1,300° C. to 1,600° C. (preferably 1,350° to 1,600° C.) to bring it to a relative density of at least 94.5% and thereafter it is subjected to the hot isostatic press sintering (HIP) at a temperature of from 1,000° C. to 1,550° C. (preferably from 1,200° C. to 1,500° C.) and under a pressure ranging from 500 kg/cm² to 2,000 kg/cm² to thereby obtain and abovementioned $ZrO_2$-$Al_2O_3$ type ceramic sintered body until a relative density of at least 99% is achieved.

The grain size of the resultant sintered body is no more than 1.5 μm, preferably 1.2 μm or below.

The thus produced $ZrO_2$-$Al_2O_3$ type ceramic sintered body according to the present invention is then subjected to grooving procedure etc. to form substrate members for the magnetic head slider, then further cut into the shape of the magnetic head slider, followed by finishing the same into the final product.

With a view to enabling those persons skiled in the art to put the present invention into practice, there will be given in the following a preferred example of manufacturing the material for the magnetic head slider according to the present invention.

EXAMPLE

Partially stabilized $ZrO_2$ component powders containing therein a stabilizing agent selected from $Y_2O_3$, MgO, CeO, etc. obtained by the coprecipitation method were blended with $Al_2O_3$ component powders having a purity of 99.9% and an average particle size of 0.5 μm, at various ratios as shown in Table 1 below, and then the blended materials were mixed and pulverized for 24 hours in a zirconia ball mill using pure water as a solvent, after which they were dried and granulated to prepare raw materials in powder form.

These raw materials were then charged into a graphite mold having a dimension of 50 mm in length, 50 mm in width and 60 mm in height, and held in it for 60 minutes at respective optimum sintering temperatures ranging from 1,300° C. to 1,600° C. and under a pressure ranging from 100 kg/cm² to 300 kg/cm². After this, the pressure was removed and allowed to cool to thereby obtain a sintered body having a dimension of 50 mm × 50 mm × 5.5 mm height. The density of these sintered bodies was measured by the water displacement method, the measured values of which were each divided by the theoretical density to calculate a relative density. The grindability and chipping resistant property of each of the sintered bodies were measured in the following manner: each of the test specimens was fixed by a jig, to which a weight of 10 kg was attached by a wire extending via a pulley, and then using a resin-bonded diamond abrasive cutting wheel, the test specimen was cut by grinding to a length of 50 mm through the load of the weight. By measurement of the time required for the cutting, the machinability (grindability) of the sintered body was evaluated. Also, the chipping resistance was evaluated by observing, through a microscope, presence or absence and size of the chipping to occur at the edge of the specimen during the abrasive cutting. Table 1 below indicates various physical values and the results of evaluation.

TABLE 1

| | Specimen No. | $ZrO_2$ Component (stabilizer wt % per $ZrO_2$) | $Al_2O_3$ Component (kind of binder and substituting quantity) (*1) | Relative Density (%) | Hardness $H_RA$ | Bending Strength (kg/mm²) | Grind-ability (*2) | Chipping Resistance (*3) |
|---|---|---|---|---|---|---|---|---|
| Present Invention | 1 | 90 (5.4% $Y_2O_3$) | 10 (1% MgO) | 99.2 | 91.5 | 139 | 116 | 10 μm or below |
| | 2 | 80 (5.4% $Y_2O_3$) | 20 (1% MgO) | 99.4 | 91.8 | 156 | 128 | 10 μm or below |
| | 3 | 70 (5.4% $Y_2O_3$) | 30 (1% MgO) | 99.3 | 92.4 | 130 | 121 | 15 μm or below |
| | 4 | 65 (5.4% $Y_2O_3$) | 35 (1% MgO) | 99.5 | 92.7 | 112 | 130 | 20 μm or below |
| | 5 | 85 (5.4% $Y_2O_3$) | 15 (2% $Y_2O_3$) | 99.2 | 91.6 | 124 | 122 | 20 μm or below |
| | 6 | 85 (5.4% $Y_2O_3$) | 15 (1% $Y_2O_3$) | 99.7 | 92.1 | 159 | 127 | 15 μm or below |
| | 7 | 85 (3% MgO) | 15 (1% $Y_2O_3$) | 99.3 | 90.9 | 120 | 113 | 20 μm or below |
| | 8 | 85 (3% MgO) | 15 (1% MgO) | 99.1 | 90.4 | 113 | 111 | 15 μm or below |
| | 9 | 90 (10% CeO) | 10 (1% MgO) | 99.0 | 90.7 | 109 | 105 | 20 μm or below |
| | 10 | 85 (10% CeO) | 15 (1% MgO) | 99.2 | 90.9 | 107 | 112 | 20 μm or below |
| | 11 | 65 (10% CeO) | 35 (1% MgO) | 99.2 | 91.1 | 101 | 138 | 20 μm or below |
| Other Examples Than Invention | 12 | 95 (5.4% $Y_2O_3$) | 5 (1% MgO) | 99.0 | 89.5 | 128 | 103 | 10 μm or below |
| | 13 | 60 (5.4% $Y_2O_3$) | 40 (1% MgO) | 99.6 | 92.9 | 94 | 154 | 40 μm or below |

TABLE 1-continued

| Specimen No. | | ZrO2 Component (stabilizer wt % per ZrO2) | Al2O3 Component (kind of binder and substituting quantity) (*1) | Relative Density (%) | Hardness $H_RA$ | Bending Strength (kg/mm$^2$) | Grind-ability (*2) | Chipping Resistance (*3) |
|---|---|---|---|---|---|---|---|---|
| | 14 | 85 (5.4% Y2O3) | 15 (3% Y2O3) | 98.3 | 90.3 | 87 | 107 | 50 μm or below |
| | 15 | 85 (5.4% Y2O3) | 15 (2.5% Y2O3) | 98.9 | 91.2 | 95 | 119 | 40 μm or below |
| Comparative | 16 | ZrO2—5.4 Y2O3 | | 98.8 | 89.2 | 133 | 100 | 10 μm or below |
| Example | 17 | Al2O3—MgO | | 99.6 | 93.5 | 70 | 190 | 120 μm or below |
| | 18 | Al2O3—30% TiC | | 99.5 | 94.0 | 85 | 50 | 100 μm or below |

(*1) Substituted quantity for Al2O3 (weight % per Al2O3).
(*2) Value obtained by dividing time required for cutting each specimen by a reference time which is a required time for cutting ZrO2—5.4% Y2O3 in comparative example, an multiplying a quotient with 100.
(*3) Size of chipping, by its length in the direction perpendicular to the cutting direction.

It is to be noted that the grindability is calculated in the following manner: the time required for cutting each test specimen was divided by a reference time, which is a time required for cutting the partially stabilized ZrO2 in the comparative example shown in Table 1, and a quotient was multiplied by 100 to obtain the specific grindability.

From Table 1 above, it may be said that the ZrO2-Al2O3 type material according to the present invention is remarkably superior, in respect of its chipping resistant and mechanical property in particular, to the conventional Al2O3-MgO type material and Al2O3-TiC type material.

The thus obtained sintered body was cut by use of a diamond grinding wheel into a rectangular parallelopiped having a dimension of 2 mm in height and 4 mm in width in its cross-section, and 20 mm in length, one end of which was shaped into a sharp knife edge. Then, by use of an annular disc of ferrite having an outer diameter of 45 mm, an inner diameter of 10 mm, and a thickness of 10 mm, the friction and wear test of the so-called "pin-disc method" was conducted, wherein the sharp knife edge of the sintered body according to the present invention was brought into contact with the ferrite disc in rotation. The test results are also indicated in Table 1 above.

From FIG. 1, it will be seen that the ZrO2-Al2O3 type material of the present invention is superior to the conventional Al2O3-MgO type material and Al2O3-TiC type material in its lubricating property, particularly, without causing wear in the counterpart material.

In this figure of the drawing, it may be noted that the test specimens No. 14 and No. 15, which are not within the scope of the present invention, exhibit their excellent lubricating property comparable to that of the present invention; however, these test specimens reveal the problems in their bending strength and chipping resistance.

From the test results, it will be observed that the ZrO2-Al2O3 type material of the present invention satisfies various characteristics required of the material for the magnetic head slider.

Although, in the foregoing the present invention has been described in detail with reference to the preferred examples thereof, it should be understood that the invention is not limited to these examples alone, but changes and modifications may be made by those persons skilled in the art without departing from the spirit and scope of the invention as recited in the entire disclosure and claimed in the appended claims.

What is claimed is:

1. A magnetic head slider which comprises a sintered body obtained by sintering a raw material powder consisting essentially of 65 to 90% by weight of a ZrO2 component which includes at least one stabilizer selected from among Y2O3, MgO and CeO, and the balance of the powder being an Al2O3 component, with 2% by weight or less of the Al2O3 component having been substituted with at least one binder selected from among Y2O3 and MgO, wherein said at least one stabilizer is included in an amount within the ranges of 1.8 to 10.5% by weight for Y2O3, 2.0 to 4.3% by weight for MgO and 8.2 to 13.4% by weight for CeO with respect to ZrO2 in said ZrO2 component;

wherein an average crystal grain size of said sintered body is 1.5 μm or below; and wherein said ZrO2 component is present in the sintered body as a ZrO2 component phase of substantially tetragonal structure.

2. A magnetic head slider as set forth in claim 1, which is a sintered body obtained by pressure-sintering said raw material powder.

3. A magnetic head slider as set forth in claim 1, wherein the tetragonal structure occupies about 80% by volume or more of the entire ZrO2 component phase.

4. A magnetic head slider as set forth in claim 3, wherein the ZrO2 component phase further includes at least one minor phase of monoclinic and cubic structure.

5. A magnetic head slider as set forth in claim 1, wherein said ZrO2 component phase constitutes a continuous matrix.

6. A magnetic head slider as set forth in claim 1, wherein said ZrO2 component has been prepared by coprecipitation or thermal decomposition of salts of the component elements.

7. A magnetic head slider as set forth in claim 1, wherein said starting raw material powder has been prepared by coprecipitation or thermal decomposition of salts of the component elements.

8. A material for a magnetic head slider which comprises a sintered body obtained by sintering a raw material powder consisting essentially of 65 to 90% by weight of a ZrO2 component which includes at least one stabilizer selected from among Y2O3, MgO and CeO, and the balance of the powder being an Al2O3 component, with 2% by weight or less of the Al2O3 component having been substituted with at least one selected from among Y2O3 and MgO, wherein said stabilizer is included in an amount within the ranges of 1.8 to 10.5% by weight for Y2O3, 2.0 to 4.3% by weight for MgO and 8.2 to 13.4% by weight for CeO with respect to ZrO2 in said ZrO2 component;

wherein an average crystal grain size of said sintered body is 1.5 μm or below; and wherein said $ZrO_2$ component is present in the sintered body as a $ZrO_2$ component phase of substantially tetragonal structure.

9. A material for the magnetic head slider as set forth in claim 8, which is a sintered body obtained by pressure-sintering said raw material powder.

10. A material for the magnetic head slider as set forth in claim 8, which is a sintered body having a relative density of at least 99%, which has been obtained by pressure-sintering of a raw material powder at a sintering temperature ranging from 1,300° C. to 1,600° C. and under a pressureure ranging from 100 $kg/cm^2$ to 300 $kg/cm^2$.

11. A material as set forth in claim 8, which is a sintered body obtained by shaping the raw material powder, then subjecting the shaped body to a pre-sintering, and thereafter subjecting the pre-sintered body to the pressure-sintering.

12. A material for the magnetic head slider as set forth in claim 11, which is a sintered body having a relative density of at least 99%, obtained by shaping the raw material powder, then subjecting the shaped body to the pre-sintering in the atmosphere at a temperature ranging from 1,300° C. to 1,600° C. to form a pre-sintered body having a relative density of 94.5% or higher, and finally subjecting the pre-sintered body to the hot isostatic press (HIP) treatment in an inactive gas atmosphere at a temperature ranging from 1,000° C. to 1,550° C. and under a pressure to 500 $kg/cm^2$ to 2,000 $kg/cm^2$.

13. A material for the magnetic head slider as set forth in claim 12, wherein said hot isostatic press treatment is done at a temperature ranging from 1,200° C. to 1,500° C.

14. A material for the magnetic head slider as set forth in claim 12, wherein the pre-sintering has been carried out at a temperature ranging from 1,350° C. to 1,600° C.

15. A material for magnetic head slider as set forth in claim 8, wherein the tetragonal structure occupies about 80% by volume or more of the entire $ZrO_2$ component phase.

16. A material for magnetic head slider as set forth in claim 15, wherein the $ZrO_2$ component phase further includes at least one minor phase or monoclinic and cubic structure.

17. A material for magnetic head slider as set forth in claim 8, wherein said $ZrO_2$ component phase constitutes a continuous matrix.

18. A material for magnetic head slider as set forth in claim 8, wherein said $ZrO_2$ component has been prepared by coprecipitation or thermal decomposition of salts of the component elements.

19. A material for magnetic head slider as set froth in claim 8, wherein said starting raw material powder has been prepared by coprecipitation or thermal decomposition of salts of the component elements.

* * * * *